United States Patent
Yang (10) Patent No.: US 11,830,236 B2
(45) Date of Patent: Nov. 28, 2023

(54) METHOD AND DEVICE FOR GENERATING AVATAR, ELECTRONIC EQUIPMENT, MEDIUM AND PRODUCT

(71) Applicant: BEIJING BAIDU NETCOM SCIENCE TECHNOLOGY CO., LTD., Beijing (CN)

(72) Inventor: Shaoxiong Yang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/456,367

(22) Filed: Nov. 23, 2021

(65) Prior Publication Data
US 2022/0084307 A1 Mar. 17, 2022

(30) Foreign Application Priority Data
Dec. 10, 2020 (CN) .......................... 202011455258.2

(51) Int. Cl.
*G06V 10/75* (2022.01)
*G06V 40/16* (2022.01)
(Continued)

(52) U.S. Cl.
CPC .......... *G06V 10/7515* (2022.01); *G06T 11/00* (2013.01); *G06V 10/242* (2022.01);
(Continued)

(58) Field of Classification Search
CPC .. G06V 10/7515; G06V 10/242; G06V 10/32; G06V 10/50; G06V 40/161;
(Continued)

(56) References Cited

U.S. PATENT DOCUMENTS

2017/0069124 A1 3/2017 Tong et al.
2020/0312002 A1* 10/2020 Comploi ................... G06T 7/50

FOREIGN PATENT DOCUMENTS

CN 108717719 A 10/2018
CN 110111246 A 8/2019
(Continued)

OTHER PUBLICATIONS

Chinese First Search Report issued in Application No. 202011455258.2, dated Jun. 27, 2023, 7 pages.
(Continued)

*Primary Examiner* — Said Broome
*Assistant Examiner* — Andrew Shin
(74) *Attorney, Agent, or Firm* — HUNTON ANDREWS KURTH LLP (57) ABSTRACT

Provided are a method and a device for generating an avatar, an electronic equipment, a medium and a product. In the method, a to-be-detected face image of a current user is acquired. The to-be-detected face image is analyzed and at least one original component of the to-be-detected face image is obtained. Each original component of the at least one original component of the to-be-detected face image is matched with each candidate component in a component set corresponding to the each original component, and a target component corresponding to the each original component of the to-be-detected face image is obtained. The target component corresponding to the each original component of the to-be-detected face image is assembled into a personalized avatar of the current user.

13 Claims, 6 Drawing Sheets

(51) Int. Cl.
- *G06V 10/32* (2022.01)
- *G06V 10/50* (2022.01)
- *G06V 10/24* (2022.01)
- *G06T 11/00* (2006.01)

(52) U.S. Cl.
CPC .............. *G06V 10/32* (2022.01); *G06V 10/50* (2022.01); *G06V 40/161* (2022.01); *G06V 40/171* (2022.01)

(58) Field of Classification Search
CPC .... G06V 40/171; G06V 40/172; G06T 11/00; G06T 11/60; G06T 2200/24
See application file for complete search history.

(56) References Cited

FOREIGN PATENT DOCUMENTS

| | | |
|---|---|---|
| CN | 110148191 A | 8/2019 |
| CN | 111652828 A | 9/2020 |

OTHER PUBLICATIONS

Chinese Office Action issued in Application No. 202011455258.2, dated Jun. 28, 2023, 18 pages.
Yang et al., "An Algorithm Generating Human Face Cartoon Portrait Including Light Editing Based on Photo," Journal of Graphics, vol. 36, No. 1, Feb. 2015, 7 pages.
Yehu et al., "Automatic Hair Detection Method for Facial Caricature Generation," Journal of Computer-Aided Design & Computer Graphics, vol. 22, No. 11, Nov. 2010, 7 pages.

\* cited by examiner

METHOD AND DEVICE FOR GENERATING AVATAR, ELECTRONIC EQUIPMENT, MEDIUM AND PRODUCT

CROSS-REFERENCE TO RELATED APPLICATION(S)

This application claims priority to Chinese Patent Application No. 202011455258.2 filed Dec. 10, 2020, the disclosure of which is incorporated herein by reference in its entirety.

TECHNICAL FIELD

The present disclosure relates to the field of artificial intelligence, further to the technical fields of deep learning, augmented reality and image recognition and, in particular, to a method and device for generating an avatar, an electronic equipment, a medium and a product.

BACKGROUND

A traditional personalized avatar is generally drawn step by step by an artist according to a user's face by following a certain style (such as a realism style, a star light Barbie style, etc.) through drawing tools (Photoshop, etc.). In the drawing process, it is necessary to draw a face avatar of a specific style according to the user's facial features, and the similarity and aesthetics of the face avatar depend on the artist's skill. The efficiency of the drawing process, which takes a long time (may take several hours), is relatively low, the cost is relatively high, and thus it is unable to achieve batch generation of face avatars according to a certain style in a short time. Moreover, the similarity between the drawn avatar and the user's face entirely depends on the artist's skill and subjective feeling without an objective and quantitative standard for evaluating the similarity. Therefore, the similarity between the drawn avatars and input of different users' face may be somewhat different, that is, may be high or low, which leads to time-consuming and laborious repeated manual modification due to users' dissatisfaction. In addition, the traditional method for drawing personalized avatars cannot reuse the avatar components. The artist needs to redraw the hairstyle, face shape, facial features, clothes and other components for input of every face photo, even if components of some faces are very similar, resulting in a waste of resources.

SUMMARY

The present disclosure provides a method and a device for generating an avatar, an electronic equipment, a medium and a product. Therefore, personalized avatars may be generated in batches without manual intervention, so that the generation efficiency is greatly improved, and time and labor costs are effectively saved.

In a first aspect, the present disclosure provides a method for generating an avatar, and the method includes the steps described below.

A to-be-detected face image of a current user is acquired.

The to-be-detected face image is analyzed and at least one original component of the to-be-detected face image is obtained.

Each original component of the at least one original component of the to-be-detected face image is matched with each candidate component in a component set corresponding to the each original component, and a target component corresponding to the each original component of the to-be-detected face image is obtained.

The target component corresponding to the each original component of the to-be-detected face image is assembled into a personalized avatar of the current user.

In a second aspect, the present disclosure provides a generation device of an avatar. The device includes an acquisition module, an analysis module, a matching module and an assembly module.

The acquisition module is configured to acquire a to-be-detected face image of a current user.

The analysis module is configured to analyze the to-be-detected face image and obtain at least one original component of the to-be-detected face image.

The matching module is configured to match each original component of the at least one original component of the to-be-detected face image with each candidate component in a component set corresponding to the each original component and obtain a target component corresponding to the each original component of the to-be-detected face image.

The assembly module is configured to assemble the target component corresponding to the each original component of the to-be-detected face image into a personalized avatar of the current user.

In a third aspect, an embodiment of the present disclosure provides an electronic equipment. The electronic equipment includes: one or more processors; and a memory, which is configured to store one or more programs.

When executed by the one or more processors, the one or more programs cause the one or more processors to implement the method for generating an avatar of any embodiment of the present disclosure.

In a fourth aspect, an embodiment of the present disclosure provides a storage medium storing a computer program. The program, when executed by a processor, implements the method for generating an avatar of any embodiment of the present disclosure.

In a fifth aspect, an embodiment of the present disclosure provides a computer program product. The computer program product, when executed by a computer equipment, implements the method for generating an avatar of any embodiment of the present disclosure.

BRIEF DESCRIPTION OF DRAWINGS

The drawings are intended to provide a better understanding of the present solution and not to limit the present disclosure.

DETAILED DESCRIPTION

Exemplary embodiments of the present disclosure, including details of embodiments of the present disclosure, are described hereinafter in conjunction with the drawings to facilitate understanding. The exemplary embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

Embodiment One

Figure 1:
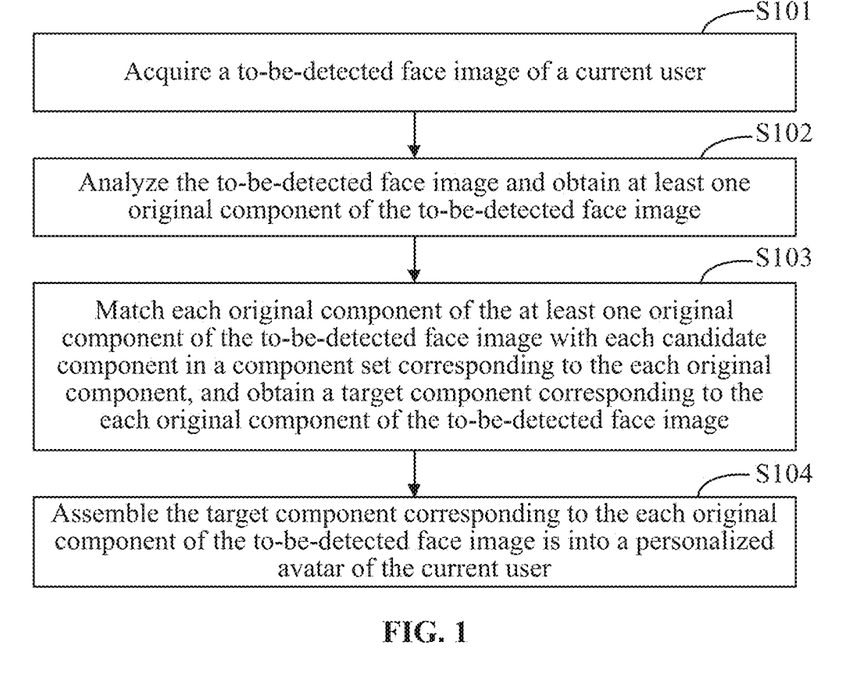
FIG. 1 is a first flowchart of a method for generating an avatar according to an embodiment of the present disclosure.

FIG. 1 is a first flowchart of a method for generating an avatar according to an embodiment of the present disclosure. The method may be executed by a device for generating an avatar or an electronic equipment. The device or the electronic equipment may be implemented as software and/or hardware. The device or the electronic equipment may be integrated in any intelligent device having the network communication function. As shown in FIG. 1, the method for generating an avatar may include the steps described below.

In step S101, a to-be-detected face image of a current user is acquired.

In this step, the electronic equipment may acquire a to-be-detected face image of a current user. Specifically, the current user may request to input a face image through the Hypertext Transfer Protocol (HTTP) as the to-be-detected face image of the current user.

In step S102, the to-be-detected face image is analyzed and at least one original component of the to-be-detected face image is obtained.

In this step, the electronic equipment may analyze the to-be-detected face image and obtain at least one original component of the to-be-detected face image. Specifically, the electronic equipment may firstly input the to-be-detected face image to a pre-trained facial landmark detection model, extract key features of the to-be-detected face image through the pre-trained facial landmark detection model, and obtain face key features of the to-be-detected face image; and then the electronic equipment may generate the at least one original component of the to-be-detected face image according to each of the face key features of the to-be-detected face image. Specifically, the at least one original component includes, and is not limited to, at least one of: a face shape component, an eye component, an eyebrow component, a nose component, a mouth component, a hair component, a neck component, a body component, or an apparel component.

In step S103, each original component of the at least one original component of the to-be-detected face image is matched with each candidate component in a component set corresponding to the each original component, and a target component corresponding to the each original component of the to-be-detected face image is obtained.

In the step, the electronic equipment may match each original component of the to-be-detected face image with each candidate component in a component set corresponding to the each original component, and obtain a target component corresponding to the each original component of the to-be-detected face image. Specifically, the electronic equipment may calculate a matching degree between the each original component of the to-be-detected face image and the each candidate component in the component set corresponding to the each original component and determine a candidate component with a maximum matching degree as the target component corresponding to the each original component of the to-be-detected face image. For example, it is to be assumed that the electronic equipment divides the to-be-detected face image into: an eye component, an eyebrow component, a nose component, an apparel component, a mouth shape component, a spectacle and scarf component, a hairstyle component, a spectacle component, and a scarf and earring component. Each of the above original components corresponds to a component set. For example, the eye component corresponds to an eye component set, the eyebrow component corresponds to an eyebrow component set, and so on. Further, each component set may include multiple component types. For example, an eye component set may include: standard eyes, a-bit-upwardly-slanted eyes, upper-slanted eyes, slender eyes, narrowed eyes, round eyes, lower-slanted eyes, triangular eyes, swollen-lidded eyes, wide-apart eyes, etc. Actually, the number of component types in each component set is far more than the number of the listed.

In step S104, the target component corresponding to the each original component of the to-be-detected face image is assembled into a personalized avatar of the current user.

In the step, the electronic equipment may assemble the target component corresponding to the each original component of the to-be-detected face image into a personalized avatar of the current user. Specifically, the electronic equipment may place the target component corresponding to the each original component at a component position corresponding to the target component. For example, the electronic equipment may place a target eye component corresponding to an original eye component at the position of the original eye component, and place a target eyebrow component corresponding to an original eyebrow component at the position of the original eyebrow component.

Optionally, a user may set a strategy for generating a personalized avatar by himself or herself through a setting interface. For example, the user may set that only one original component or a few original components generated are replaced by target components corresponding to the one original component or the few original components, and the rest original components are reserved; or, the user may also choose whether to replace the original component with a default target component, etc.

According to the method for generating an avatar provided by the embodiment of the present disclosure, a to-be-detected face image of a current user is acquired. The to-be-detected face image is analyzed and at least one original component of the to-be-detected face image is obtained. Each original component of the at least one original component of the to-be-detected face image is matched with each candidate component in a component set corresponding to the each original component, and a target component corresponding to the each original component of the to-be-detected face image is obtained. The target component corresponding to the each original component of the to-be-detected face image is assembled into a personalized avatar of the current user. In other words, the personalized avatar of the current user can be automatically generated in the present disclosure. The related method for generating an avatar depends on artist's skill and subjective feeling, so that personalized avatars cannot be generated in batches due to long time consumption and low efficiency. The present disclosure adopts the technical means that a to-be-detected face image is divided into at least one original component, each original component is matched with each candidate component in a component set corresponding to the each original component, and then a personalized avatar is assembled. Therefore, the problem in the related art of the dependence on artist's skill and subjective feeling and thus the incapability to generate personalized avatars in batches due to long time consumption and low efficiency is solved. According to the technical solution provided by the present disclosure, personalized avatars can be generated in batches without manual intervention, so that the generation efficiency is greatly improved, and time and labor costs are effectively saved. Moreover, the solution of the embodiment of the present disclosure is simple and convenient to achieve, easy to popularize and has a wider application range.

Embodiment Two

Figure 2:
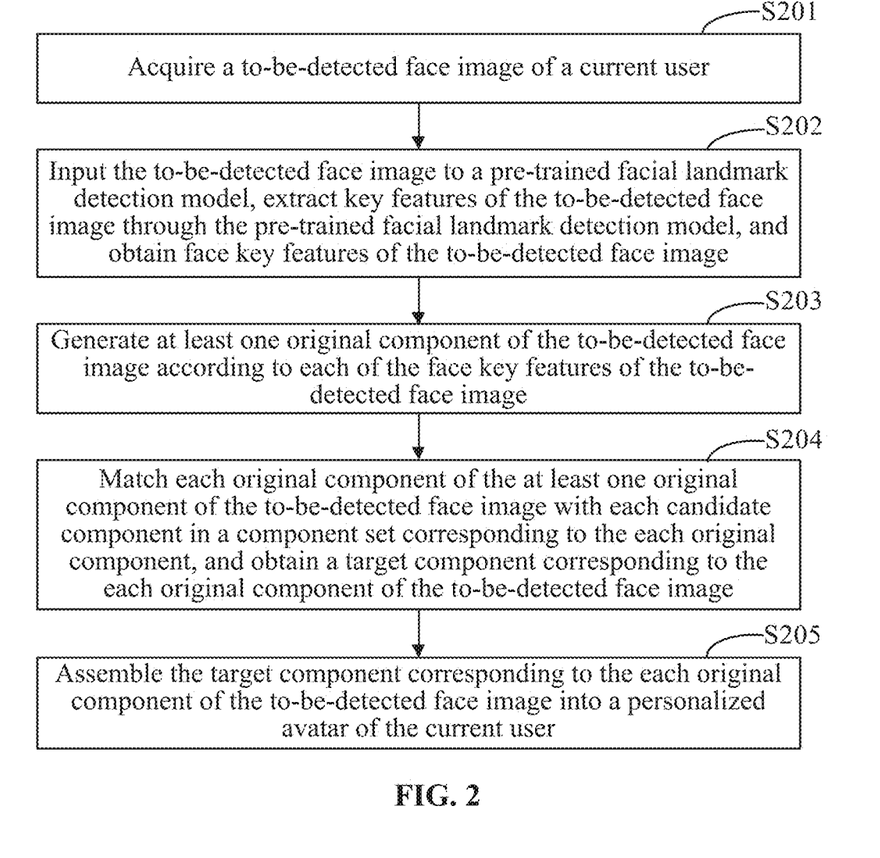
FIG. 2 is a second flowchart of a method for generating an avatar according to an embodiment of the present disclosure.

FIG. 2 is a second flowchart of a method for generating an avatar according to an embodiment of the present disclosure. The method is further optimized and expanded based on the above technical solution, and may be combined with each of the above alternative embodiments. As shown in FIG. 2, the method for generating an avatar may include the steps described below.

In step S201, a to-be-detected face image of a current user is acquired.

In step S202, the to-be-detected face image is input to a pre-trained facial landmark detection model, key features of the to-be-detected face image are extracted through the pre-trained facial landmark detection model, and face key features of the to-be-detected face image are obtained.

In the step, an electronic equipment may input the to-be-detected face image to a pre-trained facial landmark detection model, extract key features of the to-be-detected face image through the pre-trained facial landmark detection model, and obtain face key features of the to-be-detected face image. Specifically, the face key features may include features at any position on the face, such as the features on the eyes, the mouth, the nose, the contours, the eye corners, the eye corner contours, etc. In the present disclosure, the face key features of the to-be-detected face image may be extracted through multiple manners. For example, a facial landmark detection model may be pre-trained. In this way, the to-be-detected face image is input to the pre-trained facial landmark detection model, and then the face key features of the to-be-detected face image are extracted. The facial landmark detection model may be any deep neural network model, such as a convolutional neural network model, a recursive neural network model and the like. In addition, in the present disclosure, the face key features of the to-be-detected face image may also be extracted through any other facial landmark detection methods in the related art. The manner for extracting the face key features of the to-be-detected face image is not limited in the present disclosure.

In step S203, at least one original component of the to-be-detected face image is generated according to each of the face key features of the to-be-detected face image.

In the step, the electronic equipment may generate at least one original component of the to-be-detected face image according to each of the face key features of the to-be-detected face image. Specifically, the electronic equipment may firstly divide, according to the each of the face key features of the to-be-detected face image, the to-be-detected face image into at least one region block, where each region block of the at least one region block corresponds to a respective region block attribute; and then generate, according to the at least one region block and the region block attribute corresponding to the each region block, the at least one original component of the to-be-detected face image, where the at least one original component includes, and is not limited to, at least one of: a face shape component, an eye component, an eyebrow component, a nose component, a mouth component, a hair component, a neck component, a body component, or an apparel component. Specifically, the region block in the present disclosure may be one small region in an original component, and the region block may be of any characteristic; if a certain region block is a small region in an eye component, the region block attribute corresponding to the region block is the eye; if a certain region block is a small region in a nose component, the region block attribute corresponding to the region block is the nose; and so on.

In step S204, each original component of the at least one original component of the to-be-detected face image is matched with each candidate component in a component set corresponding to the each original component, and a target component corresponding to the each original component of the to-be-detected face image is obtained.

In the step, the electronic equipment may match each original component of the at least one original component of the to-be-detected face image with each candidate component in a component set corresponding to the each original component, and obtain a target component corresponding to the each original component of the to-be-detected face image. Specifically, the electronic equipment may calculate a matching degree between the each original component of the to-be-detected face image and the each candidate component in the component set corresponding to the each original component and determine a candidate component with a maximum matching degree as the target component corresponding to the each original component of the to-be-detected face image. For example, it is assumed that an eye component set may include: standard eyes, a-bit-upwardly-slanted eyes, upper-slanted eyes, slender eyes, narrowed eyes, round eyes, lower-slanted eyes, triangular eyes, swollen-lidded eyes, wide-apart eyes, etc. The electronic equipment may calculate the matching degree between an original eye component and each of the above candidate components, and determine the candidate component with the maximum matching degree as the target component corresponding to the original eye component.

Preferably, in the specific embodiment of the present disclosure, various manners may be applied to the method of calculating a matching degree between the each original component of the to-be-detected face image and the each candidate component in the component set corresponding to the each original component. For example, the matching algorithm mainly adopts methods such as the contour mask shape matching based on key features and segmentation mask, the intersection over union (IOU) matching, the geometric feature (such as length-width ration of a bounding rectangle) matching and the histogram matching. In addition, the measurement of the similarity in the present disclosure may be achieved through a cosine distance.

In step S205, the target component corresponding to the each original component of the to-be-detected face image is assembled into a personalized avatar of the current user.

According to the method for generating an avatar provided by the embodiment of the present disclosure, a to-be-detected face image of a current user is acquired. The to-be-detected face image is analyzed and at least one original component of the to-be-detected face image is obtained. Each original component of the at least one original component of the to-be-detected face image is matched with each candidate component in a component set corresponding to the each original component, and a target component corresponding to the each original component of the to-be-detected face image is obtained. The target component corresponding to the each original component of the to-be-detected face image is assembled into a personalized avatar of the current user. In other words, the personalized avatar of the current user can be automatically generated in the present disclosure. The related method for generating an avatar depends on artist's skill and subjective feeling, so that personalized avatars cannot be generated in batches due to long time consumption and low efficiency. The present disclosure adopts the technical means that a to-be-detected face image is divided into at least one original component, each original component is matched with each candidate component in a component set corresponding to the each original component, and then a personalized avatar is assembled. Therefore, the problem in the related art of the dependence on artist's skill and subjective feeling and thus the incapability to generate personalized avatars in batches due to long time consumption and low efficiency is solved. According to the technical solution provided by the present disclosure, personalized avatars can be generated in batches without manual intervention, so that the generation efficiency is greatly improved, and time and labor costs are effectively saved. Moreover, the solution of the embodiment of the present disclosure is simple and convenient to achieve, easy to popularize and has a wider application range.

Embodiment Three

Figure 3:
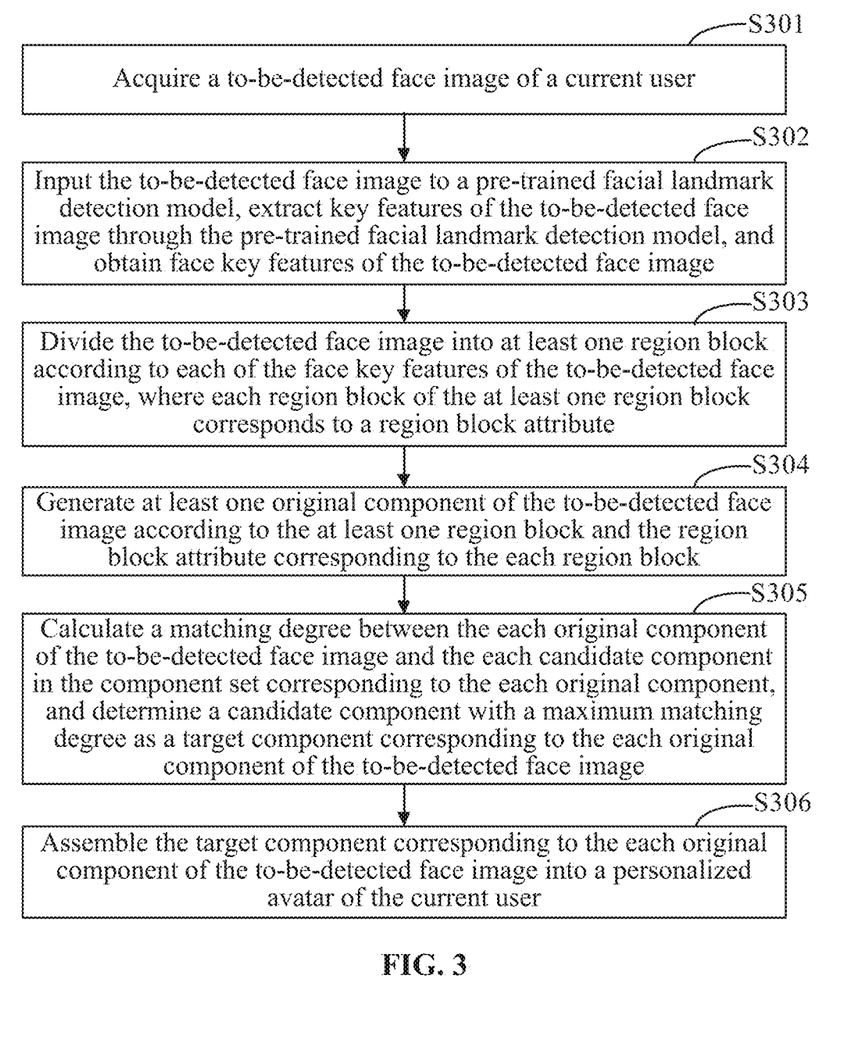
FIG. 3 is a third flowchart of a method for generating an avatar according to an embodiment of the present disclosure.

FIG. 3 is a third flowchart of a method for generating an avatar according to an embodiment of the present disclosure. The method is further optimized and expanded based on the above technical solution, and may be combined with each of the above alternative embodiments. As shown in FIG. 3, the method for generating an avatar may include the steps described below.

In step S301, a to-be-detected face image of a current user is acquired.

In step S302, the to-be-detected face image is input to a pre-trained facial landmark detection model, key features of the to-be-detected face image are extracted through the pre-trained facial landmark detection model, and face key features of the to-be-detected face image are obtained.

Preferably, in the specific embodiment of the present disclosure, before inputting the to-be-detected face image to the pre-trained facial landmark detection model, an electronic equipment may further input the to-be-detected face image to a pre-trained face detection model, and obtain a face detection frame of the to-be-detected face image by identifying the to-be-detected face image through the pre-trained face detection model; expand the face detection frame of the to-be-detected face image by a preset multiple and obtain an expanded face detection frame; intercept a face image of the to-be-detected face image in the expanded face detection frame to obtain an intercepted face image; adjust the intercepted face image to a preset dimension to obtain an adjusted face image; and execute the operation of inputting the to-be-detected face image to the pre-trained facial landmark detection model.

In step S303, the to-be-detected face image is divided into at least one region block according to each of the face key features of the to-be-detected face image, where each region block of the at least one region block corresponds to a respective region block attribute.

In this step, the electronic equipment may divide, according to each of the face key features of the to-be-detected face image, the to-be-detected face image into at least one region block, where each region block of the at least one region block corresponds to a respective region block attribute. Specifically, the region block in the present disclosure may be one small region in an original component, and the region block may be of any characteristic; if a certain region block is a small region in an eye component, the region block attribute corresponding to the region block is the eye; if a certain region block is a small region in a nose component, the region block attribute corresponding to the region block is the nose; and so on.

In step S304, at least one original component of the to-be-detected face image is generated according to the at least one region block and the region block attribute corresponding to the each region block.

In this step, the electronic equipment may generate at least one original component of the to-be-detected face image according to the at least one region block and the region block attribute corresponding to the each region block, where the at least one original component includes, and is not limited to, at least one of: a face shape component, an eye component, an eyebrow component, a nose component, a mouth component, a hair component, a neck component, a body component, or an apparel component. Specifically, the electronic equipment may integrate region blocks having the same region block attribute, so that each original component of the to-be-detected face image can be obtained. For example, the electronic equipment may integrate region blocks having the region block attribute as the eye and obtain an original eye component of the to-be-detected face image; and integrate region blocks having the region block attribute as the nose and obtain an original nose component of the to-be-detected face image; and so on.

Preferably, in the specific embodiment of the present disclosure, the electronic equipment may further abstract, from the at least one original component of the to-be-detected face image, an original component as a current original component; in a case where a dimension of the current original component is different from a dimension of each candidate component in a component set corresponding to the current original component, adjust the dimension of the current original component to be the dimension of the each candidate component in the component set corresponding to the current original component; and repeat the operations described above until a dimension of the each original component of the to-be-detected face image is adjusted to a dimension of each candidate component in a component set corresponding to the each original component of the to-be-detected face image. Further, in a case where a rotation angle of the current original component is different from a rotation angle of the each candidate component in the component set corresponding to the current original component, the electronic equipment may further adjust the rotation angle of the current original component to be the rotation angle of the each candidate component in the component set corresponding to the current original component.

In step S305, a matching degree between the each original component of the to-be-detected face image and the each candidate component in the component set corresponding to the each original component is calculated, and a candidate component with a maximum matching degree is determined as a target component corresponding to the each original component of the to-be-detected face image.

In step S306, the target component corresponding to the each original component of the to-be-detected face image is assembled into a personalized avatar of the current user.

Compared with the traditional manual drawing method, the method for generating an avatar provided by the present disclosure may save time and effort, and achieve batch generation in view of a large number of pictures in a short time. Moreover, a set of matching algorithms may be applied to template and material libraries having different styles and generate one or more styles of personalized avatars at the same time (such as a star light Barbie style, an oil painting realistic style, a marker style, a cute baby style, etc.), which greatly frees the hands of the artist and saves the artist from heavy and repetitive work. As long as the template and material libraries of one or several styles are prepared in advance, personalized and multi-style avatars with high similarity and great beauty may be completely automatically generated by adopting the solution provided by the present disclosure, the process of which is very simple and fast. In addition, the similarity is calculated based on very objective matching algorithms rather than the subjective feeling of the artist, so that the similarity is ensured. Moreover, the similarity of the generated avatar may be further improved by expanding candidate components of a component material library.

Figure 4A:
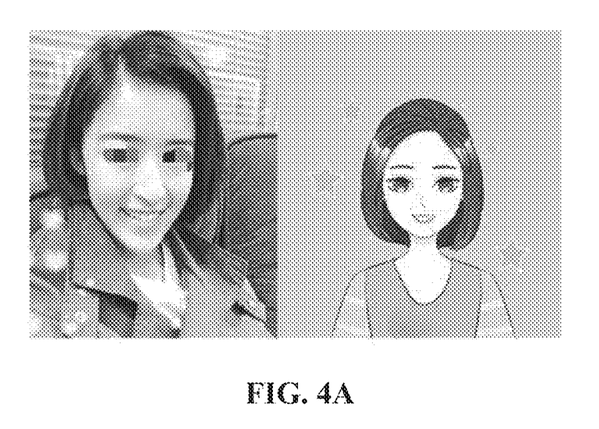
FIG. 4A is a first diagram showing an effect of a generated avatar according to an embodiment of the present disclosure.
Figure 4B:
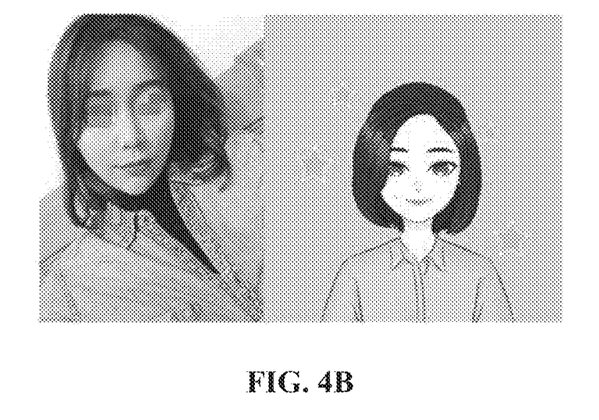
FIG. 4B is a second diagram showing an effect of a generated avatar according to an embodiment of the present disclosure.
Figure 4C:
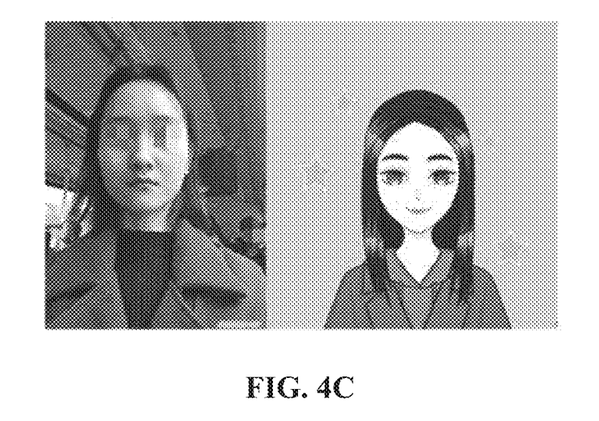
FIG. 4C is a third diagram showing an effect of a generated avatar according to an embodiment of the present disclosure.

FIG. 4A is a first diagram showing an effect of a generated avatar according to an embodiment of the present disclosure. As shown in FIG. 4A, original components of the current user's to-be-detected face are: short hair, smiling face, mouth with teeth exposed and hair not covering eyes, so that the generated personalized avatar also has short hair, smiling face, mouth with teeth exposed and hair not covering eyes, and the generated personalized avatar is consistent with the original components of the to-be-detected face. FIG. 4B is a second diagram showing an effect of a generated avatar according to an embodiment of the present disclosure. As shown in FIG. 4B, original components of the current user's to-be-detected face are: short hair, smiling, mouth with teeth not exposed, hair slightly covering the eyes, so that the generated personalized avatar also has short hair, smiling, mouth with teeth not exposed, hair slightly covering the eyes, and the generated personalized avatar is consistent with the original components of the to-be-detected face. FIG. 4C is a third diagram showing an effect of a generated avatar according to an embodiment of the present disclosure. As shown in FIG. 4B, original components of the current user's to-be-detected face are: long hair, serious expression, mouth with teeth not exposed, hair not covering eyes, so that the generated personalized avatar also has long hair, serious expression, mouth with teeth not exposed, hair not covering eyes, and the generated personalized avatar is consistent with the original components of the to-be-detected face.

According to the method for generating an avatar provided by the embodiment of the present disclosure, a to-be-detected face image of a current user is acquired. The to-be-detected face image is analyzed and at least one original component of the to-be-detected face image is obtained. Each original component of the at least one original component of the to-be-detected face image is matched with each candidate component in a component set corresponding to the each original component, and a target component corresponding to the each original component of the to-be-detected face image is obtained. The target component corresponding to the each original component of the to-be-detected face image is assembled into a personalized avatar of the current user. In other words, the personalized avatar of the current user can be automatically generated in the present disclosure. The related method for generating an avatar depends on artist's skill and subjective feeling, so that personalized avatars cannot be generated in batches due to long time consumption and low efficiency. The present disclosure adopts the technical means that a to-be-detected face image is divided into at least one original component, each original component is matched with each candidate component in a component set corresponding to the each original component, and then a personalized avatar is assembled. Therefore, the problem in the related art of the dependence on artist's skill and subjective feeling and thus the incapability to generate personalized avatars in batches due to long time consumption and low efficiency is solved. According to the technical solution provided by the present disclosure, personalized avatars can be generated in batches without manual intervention, so that the generation efficiency is greatly improved, and time and labor costs are effectively saved. Moreover, the solution of the embodiment of the present disclosure is simple and convenient to achieve, easy to popularize and has a wider application range.

Embodiment Four

Figure 5:
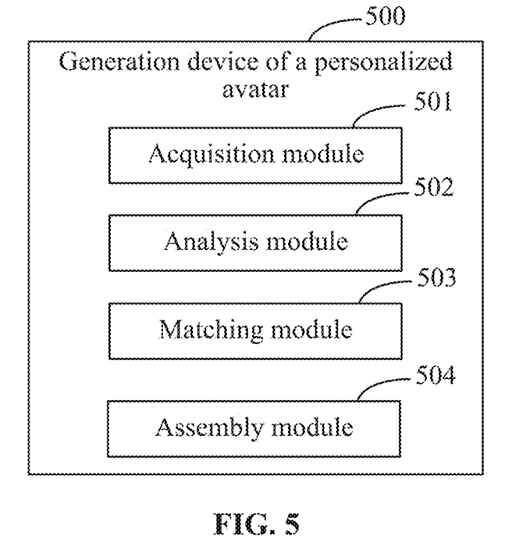
FIG. 5 is a structural diagram of a generation device of an avatar according to an embodiment of the present disclosure.

FIG. 5 is a structural diagram of a device for generating an avatar according to an embodiment of the present disclosure. As shown in FIG. 5, the device 500 includes: an acquisition module 501, an analysis module 502, a matching module 503 and an assembly module 504.

The acquisition module 501 is configured to acquire a to-be-detected face image of a current user.

The analysis module 502 is configured to analyze the to-be-detected face image and obtain at least one original component of the to-be-detected face image.

The matching module 503 is configured to match each original component of the at least one original component of the to-be-detected face image with each candidate component in a component set corresponding to the each original component and obtain a target component corresponding to the each original component of the to-be-detected face image.

The assembly module 504 is configured to assemble the target component corresponding to the each original component of the to-be-detected face image into a personalized avatar of the current user.

Figure 6:
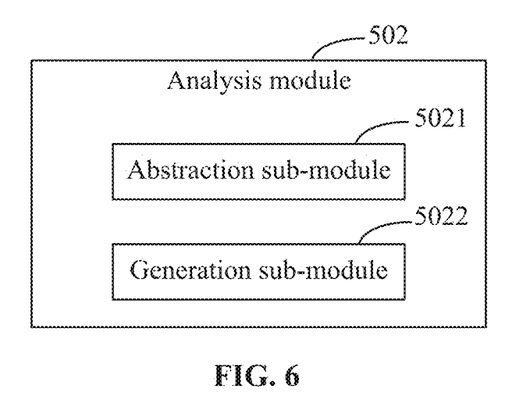
FIG. 6 is a structural diagram of an analysis module according to an embodiment of the present disclosure.

FIG. 6 is a structural diagram of an analysis module according to an embodiment of the present disclosure. As shown in FIG. 6, the analysis module 502 includes: an abstraction sub-module 5021 and a generation sub-module 5022.

The abstraction sub-module 5021 is configured to input the to-be-detected face image to a pre-trained facial landmark detection model, and extract key features of the to-be-detected face image through the facial landmark detection model and obtain face key features of the to-be-detected face image.

The generation sub-module 5022 is configured to generate the at least one original component of the to-be-detected face image according to each of the face key features of the to-be-detected face image.

Further, the generation sub-module 5022 is specifically configured to divide, according to the each of the face key features of the to-be-detected face image, the to-be-detected face image into at least one region block, where each region block of the at least one region block corresponds to a respective region block attribute; and generate, according to the at least one region block and the region block attribute corresponding to the each region block, the at least one original component of the to-be-detected face image; where the at least one original component includes at least one of: a face shape component, an eye component, an eyebrow component, a nose component, a mouth component, a hair component, a neck component, a body component, or an apparel component.

Further, the analysis module 502 further includes: an adjustment sub-module 5023 (not shown in the figure), which is configured to abstract, from the at least one original component of the to-be-detected face image, an original component as a current original component; and in a case where a dimension of the current original component is different from a dimension of each candidate component in a component set corresponding to the current original component, adjust the dimension of the current original component to be the dimension of the each candidate component in the component set corresponding to the current original component; and repeat the operations described above until a dimension of the each original component of the to-be-detected face is adjusted to a dimension of each candidate component in a component set corresponding to the each original component of the to-be-detected face.

Further, the adjustment sub-module 5023 is further configured to, in a case where a rotation angle of the current original component is different from a rotation angle of the each candidate component in the component set corresponding to the current original component, adjust the rotation angle of the current original component to be the rotation angle of the each candidate component in the component set corresponding to the current original component.

Further, the abstraction sub-module 5021 is further configured to input the to-be-detected face image to a pre-trained face detection model, and obtain a face detection frame of the to-be-detected face image by identifying the to-be-detected face image through the pre-trained face detection model; expand the face detection frame of the to-be-detected face image by a preset multiple to obtain an expanded face detection frame; intercept a face image of the to-be-detected face image in the expanded face detection frame to obtain an intercepted face image; adjust the intercepted face image to a preset dimension to obtain an adjusted face image; and execute the operation of inputting the to-be-detected face image to the pre-trained facial landmark detection model.

Further, the matching module 503 is configured to calculate a matching degree between the each original component of the to-be-detected face image and the each candidate component in the component set corresponding to the each original component, and determine a candidate component with a maximum matching degree as the target component corresponding to the each original component of the to-be-detected face image.

The above generation device of an avatar can execute the method provided by any embodiment of the present disclosure, and has functional modules and beneficial effects corresponding to the executed method. For technical details not described in detail in the embodiment, reference may be made to the method for generating an avatar provided in any embodiment of the present disclosure.

Embodiment Five

According to the embodiments of the present disclosure, the present disclosure further provides an electronic equipment, a readable storage medium and a computer program product.

Figure 7:
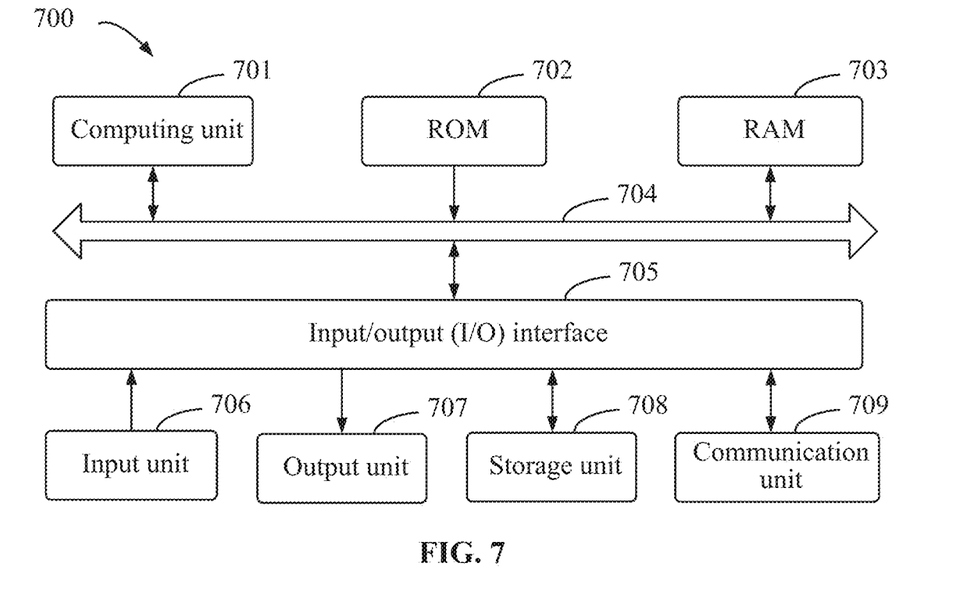
FIG. 7 is a block diagram of an electronic equipment for implementing a method for generating an avatar according to an embodiment of the present disclosure.

FIG. 7 illustrates a block diagram of an example electronic equipment 700 capable of implementing the embodiments of the present disclosure. Electronic equipments are intended to represent various forms of digital computers, for example, laptop computers, desktop computers, worktables, personal digital assistants, servers, blade servers, mainframe computers and other applicable computers. Electronic equipments may further represent various forms of mobile devices, for example, personal digital assistants, cellphones, smartphones, wearable equipments and other similar computing devices. Herein the shown components, the connections and relationships between these components, and the functions of these components are illustrative only and are not intended to limit the implementation of the present disclosure as described and/or claimed herein.

As shown in FIG. 7, the equipment 700 includes a computing unit 701. The computing unit 702 may execute various types of appropriate operations and processing based on a computer program stored in a read-only memory (ROM) 702 or a computer program loaded from a storage unit 708 to a random-access memory (RAM) 703. Various programs and data required for operations of the equipment 700 may also be stored in the RAM 703. The computing unit 701, the ROM 702 and the RAM 703 are connected to each other through a bus 704. An input/output (I/O) interface 705 is also connected to the bus 704.

Multiple components in the equipment 700 are connected to the I/O interface 705. The multiple components include an input unit 706 such as a keyboard and a mouse, an output unit 707 such as various types of displays and speakers, the storage unit 708 such as a magnetic disk and an optical disk, and a communication unit 709 such as a network card, a modem or a wireless communication transceiver. The communication unit 709 allows the equipment 700 to exchange information/data with other equipments over a computer network such as the Internet and/or various telecommunications networks.

The computing unit 701 may be various general-purpose and/or dedicated processing components having processing and computing capabilities. Some examples of the computing unit 701 include, but are not limited to, central processing units (CPUs), graphics processing units (GPUs), various dedicated artificial intelligence (AI) computing chips, various computing units running machine learning models and algorithms, digital signal processors (DSPs) and any suitable processors, controllers and microcontrollers. The computing unit 701 executes various methods and processing described above, such as the method for generating an avatar. For example, in some embodiments, the method for generating an avatar may be implemented as a computer software program tangibly contained in a machine-readable medium such as the storage unit 708. In some embodiments, part or all of a computer program may be loaded and/or installed on the equipment 700 via the ROM 702 and/or the communication unit 709. When the computer program is loaded to the RAM 703 and executed by the computing unit 701, one or more steps of the method for generating an avatar may be executed. Alternatively, in other embodiments, the computing unit 701 may be configured, in any other suitable manner (for example, by means of firmware), to execute the method for generating an avatar.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting data and instructions to the memory system, the at least one input device and the at least one output device.

Program codes for implementing the methods of the present disclosure may be compiled in any combination of one or more programming languages. These program codes may be provided for a processor or controller of a general-purpose computer, a dedicated computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or in conjunction with a system, device or equipment that executes instructions. The machine-readable medium may be a machine-readable signal medium or a machine-readable storage medium. The machine-readable medium may include, but are not limited to, electronic, magnetic, optical, electromagnetic, infrared or semiconductor systems, devices or equipments or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory equipment, a magnetic memory equipment or any suitable combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host, which is a host product in a cloud computing service system, so as to solve the defects of difficult management and weak business scalability in traditional physical hosts and VPS services. The server may also be a server of a distributed system, or a server combined with blockchain.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors. Any modifications, equivalent substitutions, improvements and the like made within the spirit and principle of the present disclosure are within the scope of the present disclosure.

What is claimed is:

1. A method for generating an avatar, comprising:
acquiring a to-be-detected face image of a current user;
analyzing the to-be-detected face image and obtaining at least one original component of the to-be-detected face image;
matching each original component of the at least one original component of the to-be-detected face image with each candidate component in a component set corresponding to the each original component, and obtaining a target component corresponding to the each original component of the to-be-detected face image; and
assembling the target component corresponding to the each original component of the to-be-detected face image into a personalized avatar of the current user;
wherein the matching the each original component of the to-be-detected face image with the each candidate component in the component set corresponding to the each original component and obtaining the target component corresponding to the each original component of the to-be-detected face image comprises:
calculating a matching degree between the each original component of the to-be-detected face image and the each candidate component in the component set corresponding to the each original component, and determining a candidate component with a maximum matching degree as the target component corresponding to the each original component of the to-be-detected face image.

2. The method according to claim 1, wherein the analyzing the to-be-detected face image and obtaining the at least one original component of the to-be-detected face image comprises:

inputting the to-be-detected face image to a pre-trained facial landmark detection model, extracting key features of the to-be-detected face image through the pre-trained facial landmark detection model, and obtaining face key features of the to-be-detected face image; and generating the at least one original component of the to-be-detected face image according to each of the face key features of the to-be-detected face image.

3. The method according to claim 2, wherein the generating the at least one original component of the to-be-detected face image according to the each of the face key features of the to-be-detected face image comprises:

dividing, according to the each of the face key features of the to-be-detected face image, the to-be-detected face image into at least one region block, wherein each region block of the at least one region block corresponds to a respective region block attribute; and generating, according to the at least one region block and the region block attribute corresponding to the each region block, the at least one original component of the to-be-detected face image, wherein the at least one original component comprises at least one of: a face shape component, an eye component, an eyebrow component, a nose component, a mouth component, a hair component, a neck component, a body component, or an apparel component.

4. The method according to claim 3, further comprising:

abstracting, from the at least one original component of the to-be-detected face image, an original component as a current original component; and in a case where a dimension of the current original component is different from a dimension of each candidate component in a component set corresponding to the current original component, adjusting the dimension of the current original component to be the dimension of the each candidate component in the component set corresponding to the current original component; and repeating the operations described above until a dimension of the each original component of the to-be-detected face image is adjusted to a dimension of each candidate component in a component set corresponding to the each original component of the to-be-detected face image.

5. The method according to claim 4, further comprising:

in a case where a rotation angle of the current original component is different from a rotation angle of the each candidate component in the component set corresponding to the current original component, adjusting the rotation angle of the current original component to be the rotation angle of the each candidate component in the component set corresponding to the current original component.

6. The method according to claim 2, before the inputting the to-be-detected face image to the pre-trained facial landmark detection model, further comprising:

inputting the to-be-detected face image to a pre-trained face detection model, and obtaining a face detection frame of the to-be-detected face image by identifying the to-be-detected face image through the pre-trained face detection model; and expanding the face detection frame of the to-be-detected face image by a preset multiple to obtain an expanded face detection frame; intercepting a face image of the to-be-detected face image in the expanded face detection frame to obtain an intercepted face image; adjusting the intercepted face image to a preset dimension to obtain an adjusted face image; and executing the operation of inputting the to-be-detected face image to the pre-trained facial landmark detection model.

7. A non-transitory computer-readable storage medium storing computer instructions for causing a computer to perform the method of claim 1.

8. An electronic equipment, comprising:

at least one processor; and a memory communicatively connected to the at least one processor; wherein the memory stores instructions executable by the at least one processor to enable the at least one processor to perform a method for generating an avatar, and the method comprises:

acquiring a to-be-detected face image of a current user;

analyzing the to-be-detected face image and obtaining at least one original component of the to-be-detected face image;

matching each original component of the at least one original component of the to-be-detected face image with each candidate component in a component set corresponding to the each original component, and obtaining a target component corresponding to the each original component of the to-be-detected face image; and assembling the target component corresponding to the each original component of the to-be-detected face image into a personalized avatar of the current user;

wherein the matching the each original component of the to-be-detected face image with the each candidate component in the component set corresponding to the each original component and obtaining the target component corresponding to the each original component of the to-be-detected face image comprises:

calculating a matching degree between the each original component of the to-be-detected face image and the each candidate component in the component set corresponding to the each original component, and determining a candidate component with a maximum matching degree as the target component corresponding to the each original component of the to-be-detected face image.

9. The electronic equipment according to claim 8, wherein the analyzing the to-be-detected face image and obtaining the at least one original component of the to-be-detected face image comprises:

inputting the to-be-detected face image to a pre-trained facial landmark detection model, extracting key features of the to-be-detected face image through the pre-trained facial landmark detection model, and obtaining face key features of the to-be-detected face image; and generating the at least one original component of the to-be-detected face image according to each of the face key features of the to-be-detected face image.

10. The electronic equipment according to claim 9, wherein the generating the at least one original component of the to-be-detected face image according to the each of the face key features of the to-be-detected face image comprises:
- dividing, according to the each of the face key features of the to-be-detected face image, the to-be-detected face image into at least one region block, wherein each region block of the at least one region block corresponds to a respective region block attribute; and
- generating, according to the at least one region block and the region block attribute corresponding to the each region block, the at least one original component of the to-be-detected face image, wherein the at least one original component comprises at least one of: a face shape component, an eye component, an eyebrow component, a nose component, a mouth component, a hair component, a neck component, a body component, or an apparel component.

11. The electronic equipment according to claim 10, further comprising:
- abstracting, from the at least one original component of the to-be-detected face image, an original component as a current original component; and
- in a case where a dimension of the current original component is different from a dimension of each candidate component in a component set corresponding to the current original component, adjusting the dimension of the current original component to be the dimension of the each candidate component in the component set corresponding to the current original component; and repeating the operations described above until a dimension of the each original component of the to-be-detected face image is adjusted to a dimension of each candidate component in a component set corresponding to the each original component of the to-be-detected face image.

12. The electronic equipment according to claim 11, further comprising:
- in a case where a rotation angle of the current original component is different from a rotation angle of the each candidate component in the component set corresponding to the current original component, adjusting the rotation angle of the current original component to be the rotation angle of the each candidate component in the component set corresponding to the current original component.

13. The method according to claim 9, before the inputting the to-be-detected face image to the pre-trained facial landmark detection model, further comprising:
- inputting the to-be-detected face image to a pre-trained face detection model, and obtaining a face detection frame of the to-be-detected face image by identifying the to-be-detected face image through the pre-trained face detection model; and
- expanding the face detection frame of the to-be-detected face image by a preset multiple to obtain an expanded face detection frame; intercepting a face image of the to-be-detected face image in the expanded face detection frame to obtain an intercepted face image; adjusting the intercepted face image to a preset dimension to obtain an adjusted face image; and executing the operation of inputting the to-be-detected face image to the pre-trained facial landmark detection model.

* * * * *